Oct. 13, 1925.  V. DELEGARD  1,557,034
BRAKE
Filed April 21, 1924
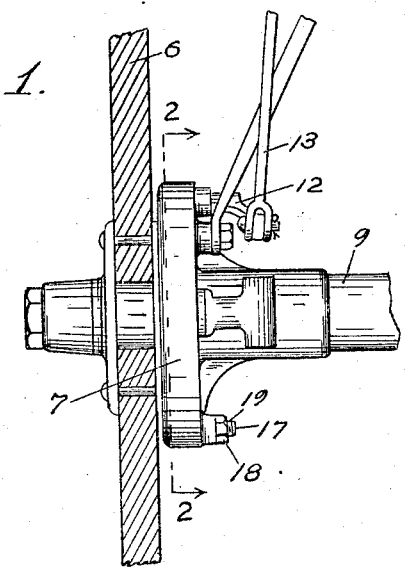
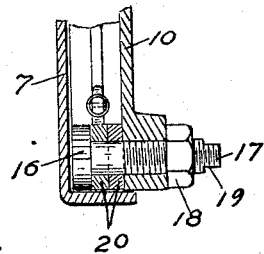
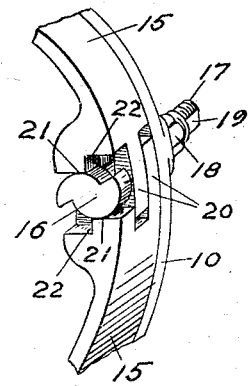
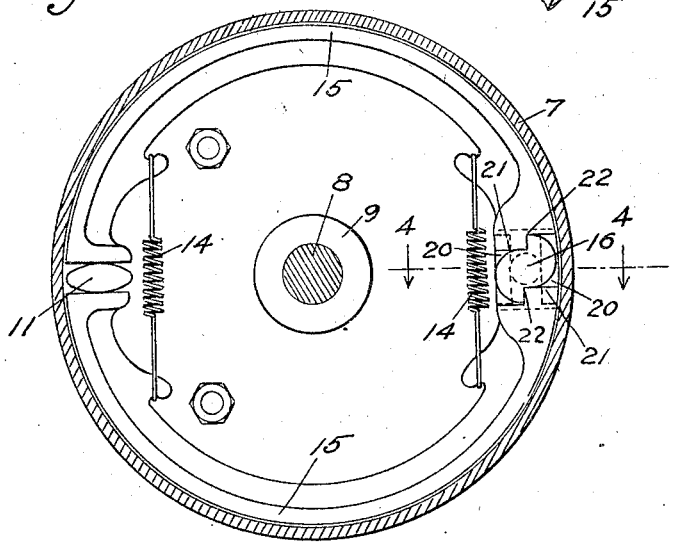
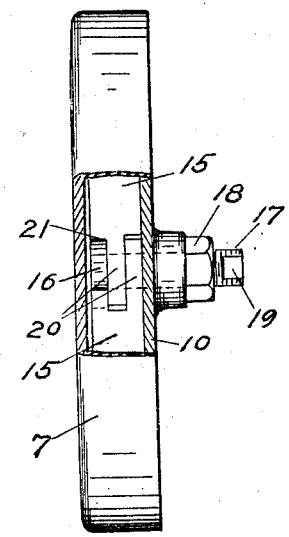
INVENTOR
VICTOR DELEGARD
BY
ATTORNEY Patented Oct. 13, 1925.

1,557,034

UNITED STATES PATENT OFFICE.

VICTOR DELEGARD, OF ST. PAUL, MINNESOTA.

BRAKE.

Application filed April 21, 1924. Serial No. 708,093.

*To all whom it may concern:*

Be it known that I, VICTOR DELEGARD, a citizen of the United States, residing at St. Paul, in the county of Ramsey and State of Minnesota, have invented certain new and useful Improvements in Brakes, of which the following is a specification.

This invention relates to improvements in brakes for wheel hubs of automobiles and other motor vehicles, and the main object is to provide a novel, efficient and practical braking construction in which a pair of brake shoes may be adjusted from time to time to take up wear, and in which the adjusting means can be regulated independently of the usual brake adjusting devices used for spreading the brake shoes when stopping the car. The invention is more particularly an improvement over the brake construction illustrated and described in the copending application for Patent Serial No. 583,135, filed on August 21st, 1922, by Carl J. Delegard and John Hawkinson.

In the accompanying drawing:

Fig. 1 is a top view of a wheel, hub, brake and axle housing assembly, of common and well known construction, the wheel being shown partly in section.

Fig. 2 is an enlarged detail section on the line 2—2 in Fig. 1.

Fig. 3 is an elevation of the brake drum, as seen from the right in Fig. 2, a fractional portion being broken away.

Fig. 4 is a detail sectional view on the line 4—4 in Fig. 2.

Fig. 5 is a perspective detail view showing the shoe adjusting cam and the shoes in adjusted positions.

Referring to the drawing more particularly and by reference characters, 6 designates a motor vehicle wheel, having a rigidly mounted brake drum 7. The axle 8, which drives the wheel, rotates in the housing 9, on which is mounted the drum closing plate 10. These elements, together with a brake shoe cam 11 which is actuated by an integral lever 12 and a rod 13, and springs 14, are all of common and well known construction.

The invention involved in the present application resides in the particular construction of a pair of brake shoes 15, and an adjusting cam member 16, which is diametrically opposed to the cam 11, or at the other ends of the brake shoes 15; the object being to use the member 16 to spread the shoes 15 more than the cam 11 would normally spread them, so that the cam 11 may properly function by spreading the shoes to cause the proper friction between the drum and the shoes or a brake band interposed therebetween. The member 16 consists of a pair of diametrically opposed scroll or semi-parabolic cams which are integrally formed on the end of a bolt 17, and this bolt screws into the plate 10, and has a lock nut 18 adapted to lock the bolt in any desired adjusted position. The bolt 17 is flattened at its outer end, as at 19, so that it may be conveniently turned by a suitable instrument such as a wrench.

The brake shoes 15 are provided with slotted yokes 20 which slidably engage the shank of the bolt 17, and they are also provided with opposed shoulders 21 which engage the peripheries of the respective cams of the member 16. The shoulders 21 are offset, as at 22, (see Figs. 2 and 5) so that the larger or outer ends of the cams will stop thereagainst when the shoes are in their fully contracted positions. This permits the cam member to be turned a full one hundred and eighty degrees when moving the shoes from their fully contracted to their fully spread positions, while in the Delegard and Hawkinson application above referred to the cam only turns ninety degrees for a complete adjustment. Furthermore, as the cams in the present case have a greater stroke the points of contact with the shoes are more acute and the resistance to the reaction of the brake shoes is therefore greater, thus lessening the liability of the cam member to slip back to the initial position shown in Fig. 2. It will also be noted that by reason of the offsets in the shoulders, when the full adjustment has been completed, by gradual adjustments from time to time, the shoes will be snapped back over the outer ends of the cams to their initial positions, thus warning the operator (who cannot see the position of the cam member) when new shoes or bands need to be inserted. New shoes or bands may be inserted and substituted for worn parts in the usual way by separating the drum and plate 10 so that access may be had to the interior of the drum.

I claim:

1. The combination with a rotatable brake drum and a stationary plate closing the end of the drum, of a pair of oppositely disposed semi-circular brake shoes adapted to frictionally brake against said drum, means at one end of the pair of shoes for spreading the same to effectuate said braking, an adjustable cam member, between the opposite ends of said shoes, having diametrically opposed semi-parabolic cams adapted to respectively engage the adjacent shoe ends, said last mentioned shoe ends being offset to permit them to be snapped into their original contracted position upon the completion of one semi-circular movement of the cam member from its initial position.

2. The combination with a rotatable brake drum and a stationary plate closing the end of the drum, of a pair of oppositely disposed semi-circular brake shoes adapted to frictionally brake against said drum, means at one end of the pair of shoes for spreading the same to effectuate said braking, a cam member mounted for rotatable adjustment between the other ends of the brake shoes, and having opposed cams for engagement therewith to spread the shoes, the shoe ends engaging said cams being offset in diametrically opposed directions, with respect to the rotating axis of the cam member, to form vertically opposed shoulders, as and for the purpose set forth.

In testimony whereof I affix my signature.

VICTOR DELEGARD.